(12) United States Patent
Ebert

(10) Patent No.: US 7,457,720 B2
(45) Date of Patent: Nov. 25, 2008

(54) ELECTRONIC LOCATION CODE

(75) Inventor: Peter S. Ebert, Menlo Park, CA (US)

(73) Assignee: SAP AG, Waldorf (DE)

( * ) Notice: Subject to any disclaimer, the term of this patent is extended or adjusted under 35 U.S.C. 154(b) by 0 days.

(21) Appl. No.: 11/842,708

(22) Filed: Aug. 21, 2007

(65) Prior Publication Data

US 2007/0288160 A1 Dec. 13, 2007

Related U.S. Application Data

(63) Continuation of application No. 11/087,971, filed on Mar. 24, 2005, now Pat. No. 7,289,931.

(51) Int. Cl.
*G06F 15/00* (2006.01)
(52) U.S. Cl. ..................................................... 702/150
(58) Field of Classification Search .................. 702/94, 702/95, 150; 342/357.03, 357.06, 357.1; 340/825.49; 701/207, 213
See application file for complete search history.

(56) References Cited

U.S. PATENT DOCUMENTS 6,014,461 A 1/2000 Hennessey et al.
2003/0227392 A1* 12/2003 Ebert et al. ............ 340/825.49
2006/0022801 A1 2/2006 Husak et al.
2006/0170565 A1* 8/2006 Husak et al. ........... 340/825.49

OTHER PUBLICATIONS

Girod, Lewis et al., "Locating Tiny Sensors in Time and Space: A Case Study" 2002 IEEE International Conference on Computer Design: VLSI in Computers and Processors (ICCD'02) Sep. 16, 2002.
EPC™ Tag Data Standards Version 1.1 Rev. 1.24, Standard Specification, Apr. 1, 2004, pp. 1-78, 2.

* cited by examiner

*Primary Examiner*—Bryan Bui
(74) *Attorney, Agent, or Firm*—Fish & Richardson P.C.

(57) ABSTRACT

An electronic location code (eLC) is described that provides location information for an object. The eLC is capable of high levels of accuracy, but uses a relatively low data volume for expressing such high levels of accuracy. Moreover, the eLC may easily be adjusted to represent lower levels of accuracy, when high levels of accuracy are not available or required. The eLC has a standardized format that allows easy transmission, sharing, and storage between a plurality of users. Due to these and other features, the eLC provides many advantages and possibilities for the use of location data, and, for example, allows for individual tracking of locations of a huge number of items.

22 Claims, 9 Drawing Sheets

| Latitude, Sign = 1 | | |
|---|---:|---|
| L1 | 26 | 011010 |
| RL1 | .8625 | |
| L2 | 39 | 100111 |
| RL2 | .005566406 | |
| L3 | 16 | 010000 |
| RL3 | 7.32422E-05 | |
| L4 | 13 | 001101 |
| RL4 | 3.50475E-06 | |
| L5 | 41 | 101001 |
| RL5 | 6.81728E-08 | |

Annotations: 802, 804, 806, 808

FIG. 8A

| Longitude, Sign = 0 | | |
|---|---:|---|
| L1 | 86 | 1010110 |
| RL1 | 1.2725 | |
| L2 | 57 | 111001 |
| RL2 | .020058594 | |
| L3 | 58 | 111010 |
| RL3 | .000145874 | |
| L4 | 27 | 011011 |
| RL4 | 1.03474E-06 | |
| L5 | 12 | 001100 |
| RL5 | 2.89082E-08 | |

FIG. 8B

| Altitude | | |
|---|---:|---|
| L1 | 46 | 101110 |
| RL1 | 154.214 | |
| L2 | 19 | 10011 |
| RL2 | 5.7765 | |
| L3 | 23 | 10111 |
| RL3 | .161265625 | |
| L4 | 21 | 10101 |
| RL4 | .00104834 | |

FIG. 8C

ELECTRONIC LOCATION CODE

CROSS REFERENCE TO RELATED APPLICATIONS

This application is a continuation of prior U.S. patent application Ser. No. 11/087,971, filed Mar. 24, 2005 now U.S Pat No. 7,289,931, which is incorporated herein by reference.

TECHNICAL FIELD

This description relates to specifying a location of an object.

BACKGROUND

There are many ways to specify a location of an object. For example, within a building, an object may be specified as being in a particular room on a certain floor of the building. Within a retail store, an object may be specified as being on a particular shelf of a designated aisle. More generally, a location of an object may be specified with reference to designated landmarks. In particular, for example, Global System for Mobile Communications (GSM) triangulation may be performed with respect to cell (telephone) towers, so as to locate a particular cell phone.

Even more generally, location may be specified with respect to the Earth's surface, using, for example, coordinates specified by a latitude, longitude, and altitude of the object. In particular, the Global Positioning System (GPS) uses a number of Earth-orbiting satellites to determine a position of a GPS transceiver that exchanges signals with the satellites.

Such location information may or may not be useful, depending on the circumstances of a user of the information. In the case of the retail store, for example, a user who is unfamiliar with a layout of the store may find aisle/shelf information to be unhelpful. Even if the user is familiar with the store layout, the user may be unable to communicate the aisle/shelf information to another user in an effective manner. Somewhat similarly, latitude, longitude, and altitude information of a GPS transceiver may be required to be expressed with respect to a map of a city in which the GPS transceiver is currently located, in order for a user of the transceiver to navigate through the city.

Such issues, related to the sharing and use of location information, may generally be magnified when large numbers of objects, frequent instances of location-gathering, and/or large numbers of users are involved. Such users may have different needs or expectations with respect to, for example, an expression, precision, transmission, storage, or use of the location information. Moreover, the needs or expectations of each user may vary according to particular types of objects, or may vary even for a single object, depending on the circumstance of the object.

SUMMARY

According to one general aspect, a system includes a first converter that is operable to convert a first location component representing a first aspect of a location of an object into a first location segment by successively transforming the first location component into a plurality of sub-segments of the location segment, each successive sub-segment representing an additional level of precision in expressing the location component, a second converter that is operable to convert a second location component representing a second aspect of a location of the object into a second location segment, the second location segment formatted according to the data format, and an aggregator that is operable to aggregate the sub-segments of the first location segment together with the second location segment to obtain a location code representing a location of the object.

Implementations may include one or more of the following features. For example, the first location component may include a latitude of the object, and the second location component may include a longitude of the object. In this case, the system may include a third converter that may be operable to convert a third location component representing a third aspect of a location of the object into a third location segment, the third location segment formatted according to the data format, for inclusion by the aggregator within the location code, wherein the third location component may include an altitude of the object.

The system may include a precision control unit that may be operable to associate a total number of bits with the location code for allocation between the first location segment and the second location segment, to thereby assign a degree of precision in expressing the first location component and the second location component to the first location segment and the second location segment, respectively, based on a length of the first location segment, the second location segment, and on the location code as a whole. In this case, the precision control unit may assign the degree of precision in expressing the first location component by assigning a total number of the sub-segments, as well as a number of bits in each sub-segment.

Further, a reference selector may be used for assigning points of reference for expressing the first location component and the second location component. In this case, a header encoder may be used to encode a header segment to express the length of the first location segment and each of the sub-segments, the second location segment, and of the location code, and further operable to express the points of reference, wherein the aggregator may be operable to concatenate the header segment to the first location segment within the location code.

The aggregator may be operable to include a header segment within the location code, the header segment expressing a format of the location code, for use by a location code decoder in converting the location code back into the first location component and second location component. In this case, the system may include a location code decoder that may be operable to receive the location code, analyze the header segment to determine the format of the location code, separate the location code into the first segment and the second segment, convert the first segment and the second segment into the first location component and the second location component, respectively.

A location database may be included that may be operable to store the location code in association with a time at which the location code was encoded. The object may be associated with a Radio Frequency Identifier (RFID) transmitter, and an operation of the first converter, second converter, and the aggregator may be triggered by a reading of a signal received from the RFID transmitter. A user interface may be included for assigning reference and precision control information characterizing the location code, for inclusion in a header segment included in the location code.

According to another general aspect, location information describing a location is received. A number of levels of precision associated with the location information is determined. The location information is transformed into a plurality of sub-segments, each sub-segment being associated with one of the levels of precision, and the sub-segments are aggregated into a first location segment.

Implementations may include one or more of the following features. For example, in receiving the location information a plurality of location components may be received, each characterizing an aspect of the location, and the number of levels of precision may be determined by determining component levels of precision for each of the location components. In this case, transforming the location information may include transforming each of the location components into component sub-segments, each component sub-segment being associated with a corresponding component level of precision. Further, aggregating the sub-segments may include aggregating the component sub-segments into component location segments, and aggregating the first location segment and the component location segments into a location code.

In assigning a header segment for attachment to the location segment, the header segment may include the number of levels of precision and reference information for decoding the location segment to obtain the location information. The location information may include altitude information, and the reference information may include an elevation model for expressing the altitude information. The reference information may include an absolute or relative coordinate system for expressing the location information.

According to another general aspect, an apparatus includes a storage medium having instructions stored thereon. The instructions include a first code segment for receiving location information, a second code segment for determining a number of levels of precision for use in expressing the location information, a third code segment for executing a transformation rule to convert the location information into a first sub-segment having a first level of precision and that provides a first remainder value, a fourth code segment for executing the transformation rule to convert the first remainder value into a second sub-segment, based on the first remainder value, and to obtain a second remainder value, and a fifth code segment for concatenating the first sub-segment and the second sub-segment into a location segment.

Implementations may include one or more of the following features. For example, the third code segment and the fourth code segment may execute the transformation rule based on a number of bits available in the first sub-segment and the second sub-segment, respectively. In this case, a sixth code segment may include a header segment with the location segment, the header segment including information for use in transforming the location segment into the location information.

The details of one or more implementations are set forth in the accompanying drawings and the description below. Other features will be apparent from the description and drawings, and from the claims.

DESCRIPTION OF DRAWINGS

FIGS. 8A-8C are tables illustrating a result of the operations of FIGS. 6 and 7.

DETAILED DESCRIPTION

Figure 1:
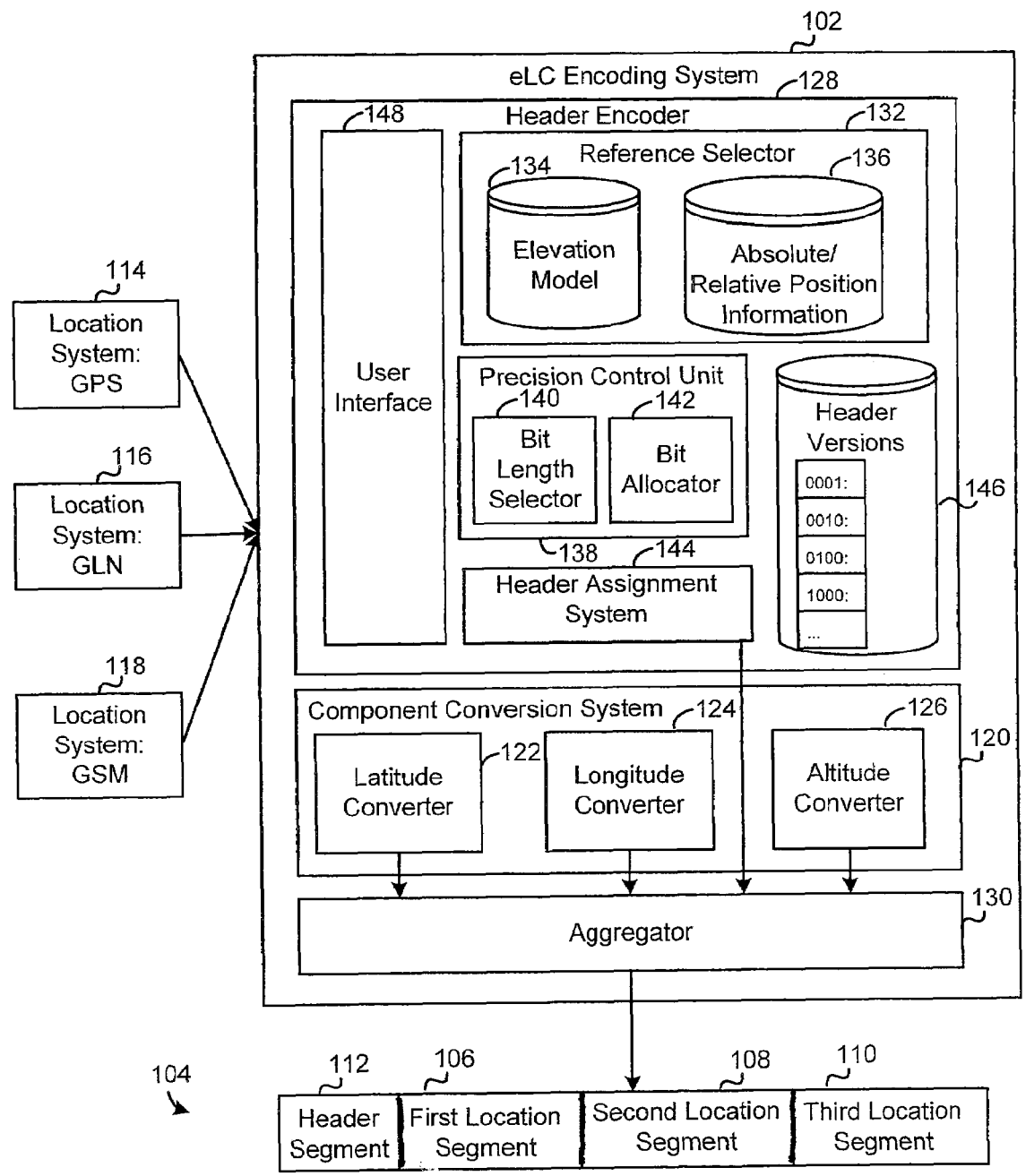
FIG. 1 is a block diagram of an electronic location code (eLC) encoding system.

FIG. 1 is a block diagram of an electronic location code (eLC) encoding system 102. The eLC encoding system 102 provides location information for an object in a corresponding code 104 that is capable of high levels of accuracy, yet with a relatively low data volume for expressing such high levels of accuracy. Moreover, the resulting location code 104 may easily be adjusted to represent lower levels of accuracy, when high levels of accuracy are not available or required. Still further, the location code 104 has a standardized format that allows easy transmission, sharing, and storage of the location code 104 between a plurality of users. Due to these and other features, the location code 104 provides many advantages and possibilities for the use of location data, as discussed in more detail below.

In FIG. 1, the eLC encoding system 102 is operable to receive location information for an object that includes multiple location components, such as, for example, a latitude, longitude, and altitude of the object, where each location component characterizes an aspect of the location of the object. The eLC encoding system 102 then transforms each of the location components into a corresponding location code segment 106, 108, 110, where the location code segments have a designated data format, e.g., binary or hexadecimal notation.

As shown in FIG. 1, the segments 106, 108, 110 are joined with a header segment 112. As described in more detail below, the header segment 112 provides information regarding, for example, a format of the location code 104. As a result, the header segment 112 may be useful in the encoding operations of the eLC encoding system 102, and, more particularly, in an eventual de-coding of the location code 104 back into the original location components of, for example, latitude, longitude, and altitude.

The eLC encoding system 102 may receive location information in a variety of different ways. By way of example, FIG. 1 illustrates three location systems 114, 116, and 118. The location system 114 is a Global Positioning System (GPS), which receives location information from a plurality of satellites, as explained above.

The location system 116 refers to the Global Location Number (GLN) that is used with the Electronic Product Code (EPC) system for tracking individual items within a Radio Frequency Identification (RFID) tracking system. The EPC system is discussed in more detail below with respect to FIGS. 4 and 5, but, for the purposes of FIG. 1, it should be understood that the GLN refers to a uniquely-assigned number that is associated with a designated physical, legal, or business entity or facility. That is, the GLN is associated with, for example, a particular warehouse, and then location information about the warehouse may be stored in association with the assigned GLN, for later access and retrieval.

The location system 118 refers to the Global System for Mobile Communications (GSM) triangulation techniques referenced above, which, as discussed, may be performed with respect to cell (telephone) towers, so as to locate a particular cell phone or other device. Some services exist that allow for a degree of cooperation between GPS and GSM devices, however, such cooperation does not provide many of the features and advantages of the location code 104, as described in detail below.

Moreover, many other techniques may be used to determine location information for conversion into the location code 104, and the systems 114, 116, and 118 are just examples. In other examples, a retail store that tracks location by aisle/shelf may have a local converter for converting such information into latitude, longitude, and altitude information, using, for example, known reference points associated with the store.

Somewhat similarly, but more specifically, a plurality of readers, such as RFID readers, may be used to determine an exact location of an item having an RFID tag. That is, as explained in more detail below, auto-identification (auto-id) systems exist in which items are associated with a tag that transmits information to a reader by way of an RF signal. The tag may transmit, for example, the EPC referred to above, so that the EPC received by the reader may be used to identify the item uniquely.

Thus, by knowing a location of the relevant RF reader or readers, a location of each item that is read may be determined to varying degrees of accuracy. More particularly, when such readers have overlapping coverage, location information may be provided through the combined coverage area that is more specific than could be obtained by a single one of the readers, using, for example, a triangulation process.

However the location information is obtained, a component conversion system 120 receives the location information, and, if necessary, resolves the location information into separate components, such as, for example, latitude, longitude, and altitude. Then, a latitude converter 122 converts the latitude component into the first location segment 106, a longitude converter 124 converts the longitude component into the second location segment 108, and an altitude converter 126 converts the altitude component into the third location segment 110.

A header encoder 128 determines properties of the header segment 112, as discussed in more detail below. Then, an aggregator 130 receives the header segment 112, along with the location segments 106, 108, and 110, and combines all four segments into the location code 104. For example, when the segments 106, 108, 110, and 112 are expressed in hexadecimal or binary format, the aggregator 130 may aggregate the segments 106, 108, 110, and 112 by concatenating the segments 106, 108, 110, and 112 in a pre-determined order, to arrive at the location code 104.

The header encoder 128 encodes the header segment 112 such that the location code 104 may easily be transmitted, stored, accessed, and de-coded. For example, the header encoder includes a reference selector 132 that provides reference information, with respect to which the latitude, longitude, and altitude may be expressed.

The reference selector may include, for example, choices for an elevation model 134 that serves as a reference point for altitude information expressed in the location code 104. Such elevation models, generally speaking, refer to models or arrays of "z" or altitude parameters over the "x,y" coordinate surface(s) of the Earth, with reference to a common point, such as, for example, sea level. For example, a number of known elevation models exist and may be used with respect to the elevation model 134 of FIG. 1.

The reference selector 132 also contains absolute/relative position information 136, where absolute position refers to location information taken with respect to the Earth's surface. In contrast, relative position information refers to location information taken with respect to some fixed coordinate system that may be the only coordinate system of interest in a given scenario.

For example, the eLC encoding system 102 may be used for location information of items being transported on a large ship. In this case, a user of the eLC encoding system 102 may only be concerned with location information relative to the ship (i.e., where the item(s) are on the ship), at least while the ship is at sea, while absolute latitude, longitude, and altitude information may not provide any additional value. More generally, relative position information may be useful whenever the full degree of absolute position is not required for a particular use or application of the eLC encoding system 102.

A precision control unit 138 allows for implementation of the location code 104 and its segments 106, 108, and 110, such that a total length of the location code 104 and/or an individual length of one or more of the segments 106, 108, and 110 may be modified to obtain more or less precision in the location information. That is, for example, the location code 104 may have multiple versions, such as a 96-bit version or a 64-bit version. Within this total bit length, portions allocated, for example, to a latitude measurement may range, theoretically, from zero to essentially an entirety of the location code (aside from a portion reserved for the header segment 112).

More particularly, the precision control unit 138 includes a bit length selector 140 that designates a total number of bits in the location code 104. Options for the total number of bits may be provided in accordance with the capabilities of the component conversion system 120.

In other implementations, the bit length selector 140 may determine bit length based on the received location information. In particular, when the received location information is not particularly precise, the bit length selector 140 may automatically prefer a 64-bit version over a 96-bit version, since the relatively greater length and precision of the 96-bit version may not be useful in this scenario. As another example, the bit length selector 140 may choose a bit length of the location code 104 based on a source and/or destination of the location code 104, or based on a preference of an operator of the eLC encoding system 102.

The precision control unit 138 further includes a bit allocator 142, that is operable to associate a number of bits with each location component. That is, for a total bit length of 96 bits, the bit allocator 142 may assign 31 bits to latitude, 32 bits to longitude, and 27 bits to altitude, with 6 bits remaining for the header segment 112. In other implementations, the bit allocator 142 may assign 43 bits to latitude, 38 bits to longitude, and only 9 bits to altitude. Thus, the bit allocator 142 allows the precision control unit 138 to adjust accuracy levels of each component, within a framework of a given, total bit length.

For example, in some situations, it may be desirable to know a latitude and longitude of an object to great accuracy, while altitude information may not be as crucial. For instance, close monitoring of an item traveling on the ground (e.g., in a vehicle, or otherwise being carried) may not require a great deal of altitude information, depending on a distance and landscape that is being traveled. On the other hand, tracking a location of an object within a large number of floors of a very tall building may require more precision (and greater bit length) for the altitude segment 110.

Once reference information and precision information is known, a header assignment system 144 may determine and output the header segment 112. For example, a database 146 of header versions may be available, so that the header assignment system 144 may simply have to compare the reference and precision requirements to a list of available header versions, and select an appropriate header version accordingly. As seen below with respect to FIG. 3, such header information allows an eLC decoding system to read the location code 104 and analyze the location code appropriately.

As such, for example, header version "000001" may represent a 96-bit location code having 31 bits, 32 bits, and 27 bits for latitude, longitude, and altitude segments, respectively, for an absolute frame of reference and a standard elevation model. Other header versions may represent other bit lengths, bit allocations, and reference information, and possibly other or different information.

In some implementations, the number of bits assigned to the header segment 112 itself may vary. In the case just mentioned, when a format of the location code 104 is very standard, the number of bits in the header segment 112 may be limited to just a few bits, or even 1 or 0 bits, in some cases. In other cases, where many versions of the header segment 112 are required (for example, when options for elevation models, reference information, or bit length/allocation are extensive, or when other information is contained in the header segment 112), then the header segment 112 may contain six or more bits. In these implementations, additional mechanisms may be required to ensure that users exchanging the location code 104 may encode/decode the location code 104, such as, for example, a pre-arranged agreement or other external communication for sharing a bit length of the header segment 112.

It should be understood that assigning greater or lesser numbers of bits to the header segment 112 will leave lesser or greater numbers of bits to be assigned to the location segments 106, 108, and 110, for a given total bit length. Accordingly, the header assignment system may be in communication with the precision control unit 138 and/or the reference selector 132, so that the latter elements may perform their respective functions in an optimal manner.

For example, in one implementation, the precision control unit 138 and/or the reference selector 132 may perform their functions, and then, if the header assignment system 144 determines that additional bits are available after selection of an appropriate version, the header assignment system 144 may allow or assign further bits for use of the precision control unit 138 and/or the reference selector 132. In other implementations, the header assignment system 144 may be in communication with the precision control unit 138 and/or the reference selector 132 during the operations of the latter elements, so that the latter elements may perform their functions accordingly.

A user interface 148 allows an operator of the eLC encoding system 102 to set parameters of the header encoder 128. For example, the interface 148 may allow the operator to designate certain bit lengths, or certain elevation models. In some implementations, for example, implementations in which parameters of the header encoder 128, or of the location code 104 itself, are pre-arranged for automatic encoding, then the user interface 148 may be scaled down or omitted entirely.

As understood from FIG. 1, a user may format an entirety of the location code 104 simply by assigning an appropriate header version. For instance, if a user is aware of which header versions are associated with certain reference and/or precision information (perhaps because the user frequently uses those header versions), then the user can switch between potentially very different formats for the location code 104, simply by inputting a single number that specifies the desired header version, by way of the user interface 148.

The reference and/or precision information, and other information, may be implemented in the operations of the component conversion system 120 in a number of different ways. In this regard, the header encoder 132 may be considered to be either active or passive.

For example, FIG. 1 may be implemented such that the header encoder 128 receives the location information from systems 114, 116, 118, and determines the precision and reference information, based thereon, or on user preferences, or on other factors. Then, the header assignment system 144 may pass this information along to the component conversion system 120, for use by the converters 122, 124, 126 in converting location components to the location segments 106, 108, and 110.

In other implementations, the component conversion system 120 may receive the location information and make determinations about how to perform the appropriate conversions, including selection of bit length/allocation and reference information. In these implementations, the operation of the header encoder 128 is more passive, in that the header encoder generally just determines an appropriate header (version) in response to information received from the component conversion system 120. In these implementations, some or all of the reference selector 132, the precision control unit 138, and the user interface 148 may be implemented in association with the component conversion system 120.

Using the eLC encoding system 102, the location code 104 describes three-dimensional locations in a highly compact, digital form. The location code 104 provides high accuracy, while minimizing data volume for transmission and storage of the location code 104. In addition, as described, the location code 104 is generically extensible, and may be efficiently processed even by small (e.g., mobile) devices. The location code 104 also is highly compressible, particularly if used to describe a plurality of location data points in one file.

Figure 2A:
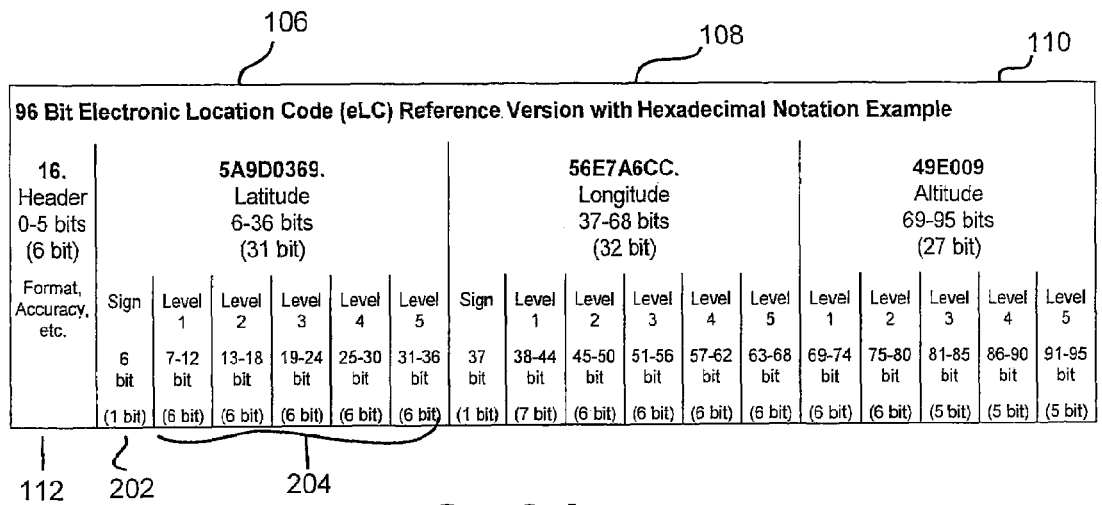
FIGS. 2A and 2B are examples of a 96 bit and a 64 bit eLC, respectively.
Figure 2B:
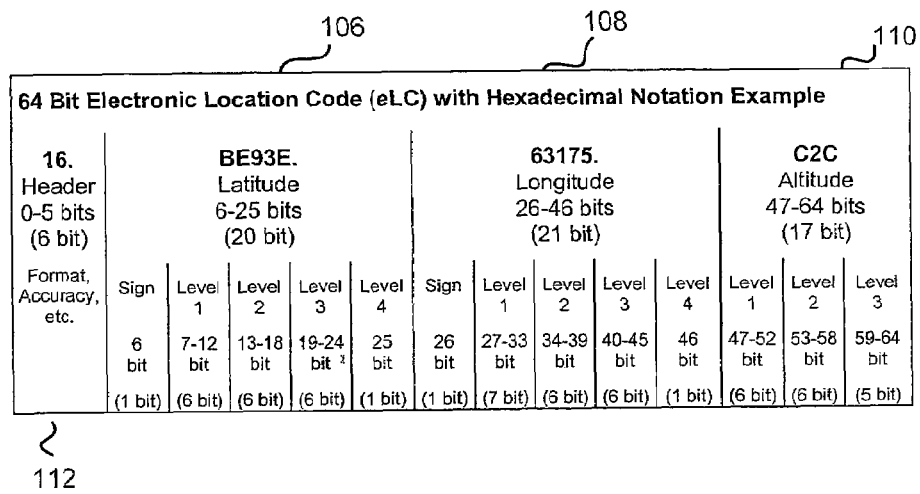

FIGS. 2A and 2B are examples of a 96 bit and a 64 bit eLC, respectively. More specifically, FIG. 2A illustrates an example of a location code 104a in which hexadecimal notation is used. The location segment 106, providing latitude information, includes a first bit level 202 that provides a sign associated with a degree of latitude that is input as part of the received location system, while sub-segments or levels 204 provide a value associated with the latitude measurement. The result is a hexadecimal location segment 206 that expresses latitude to a desired level of accuracy, with respect to the designated reference(s).

The number of levels 204 may be assigned by the bit allocator 142, depending on a desired or required level of accuracy. That is, a higher number of levels allows for greater precision of expression of latitude information. In FIG. 2A, the segment 106 includes five sub-segments, or levels, and, specifically, each level includes 6 bits. Similar comments apply to the segments 108 and 110, and to the location code 104b of FIG. 2B, as illustrated.

Although hexadecimal notation is illustrated in FIGS. 2A and 2B, other notation may be used, such as, for example, binary notation. Details as to how bit allocation is performed with respect to the segment 106 (and other segments 108, 110), as well as with respect to levels 204, are discussed in more detail, below. Further, examples of how latitude, longitude, and altitude information, expressed in, e.g., degrees or meters, are converted to hexadecimal or binary format (that is, the operation of the converters 122, 124, and 126) also are provided below.

Figure 3:
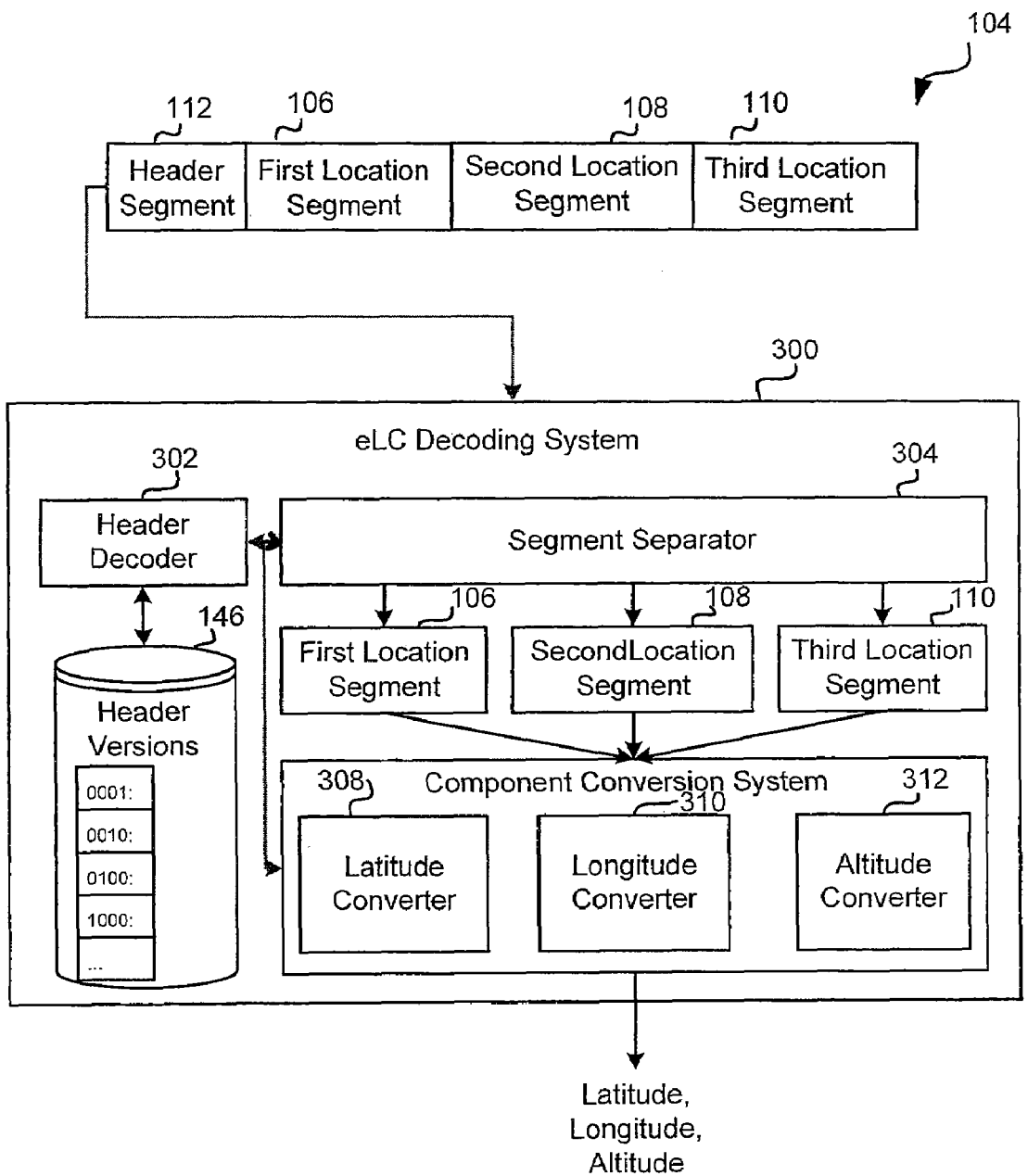
FIG. 3 is a block diagram of an eLC decoding system.

FIG. 3 is a block diagram of an eLC decoding system 300. As shown, the eLC decoding system 300 receives the location code 104, and interprets the header segment 112 using a header decoder 302. In one implementation, the header decoder 302 simply matches the header information with the database 146 of header versions. In this way, the eLC decoding system 300 may easily determine a total bit length, a bit allocation, and reference information associated with the location code 104.

A segment separator 304 receives this information from the header decoder 302, and separates the location code 104 into its segments 106, 108, 110. That is, the segment separator performs the separation based on the knowledge, in the example 104*a* of FIG. 2A, that the location code 104 is 96 bits long, and that the latitude segment 106 is included in bits 6-36 thereof, for a total of 31 bits. Similar comments apply to the segments 108 and 110, and to the example code 104*b* of FIG. 2B.

A component conversion system 306 receives the segments 106, 108, 110, and converts them to, for example, units of degrees and meters, using a latitude converter 308, a longitude converter 310, and an altitude converter 312, respectively. The component conversion system 306 may receive information on bit allocation of the sub-segments, or levels, such as the levels 204 of FIG. 2A, from the header decoder 302, perhaps by way of the segment separator 304.

FIGS. 1-3 thus illustrate techniques by which location may be shared in a standardized way between parties. Of course, the eLC encoding system 102 and decoding system 300 may be implemented together, since a given operator of the systems 102 and 300 may be transmitting and receiving location information on a regular basis. As such, certain functionalities of the systems 102 and 300 may be implemented together, for efficiency's sake. For example, the converters 122, 124, and 126 may share functionality with converters 308, 310, and 312, and maybe implemented together.

Figure 4:
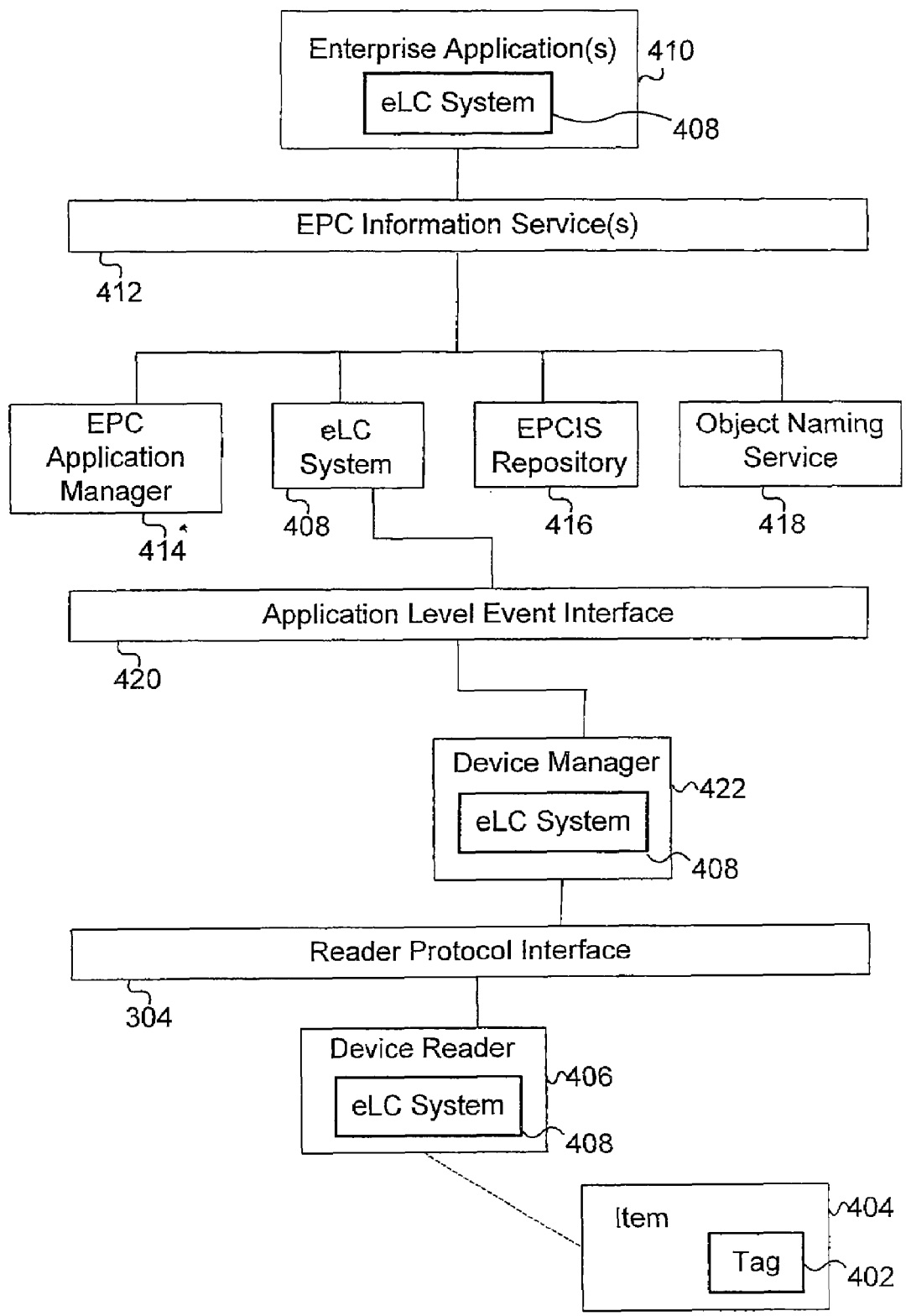
FIG. 4 is a block diagram of an item tracking system for use with the encoding/decoding systems of FIGS. 1 and 3.

FIG. 4 is a block diagram of an item tracking system 400 for use with the encoding/decoding systems 102/300 of FIGS. 1 and 3. More specifically, FIG. 4 is a block diagram of a network architecture for use with an auto-id tracking system for tracking individual objects or items, such as, for example, items being manufactured, distributed, and sold. In one implementation, the system 400 relies on the Electronic Product Code (EPC) referenced above, in order to track items on an individual level.

In other words, the EPC refers to a unique number, similar to a Uniform Product Code (UPC) identifier, that has a predefined format and scheme which multiple organizations and enterprises have agreed to use in uniquely designating and identifying their respective products, goods, or services, or collections thereof (e.g., pallets, cases, or truck-loads). In the context of RFID systems, for example, the EPC may be assigned to a tag 402 of an item 404, so that the tag may be read by an RFID reader 406. A classic EPC, for example, is defined by four fields: header field (to distinguish different formats), manufacture field (each organization that assigns the EPC has its own manufacture field), product field (product code), and serial number (with the product or item itself).

Device readers such as the reader 406 may be widely distributed, for example, across the operations of an enterprise or enterprises. For example, device readers may be stationed throughout a particular warehouse or retail store, or throughout a plurality of manufacturing facilities, warehouses, distribution centers, and retail stores of a supply chain of an enterprise.

Although only a single reader 406 is shown in FIG. 4 for convenience, the number of goods produced and sold in daily commerce implies that item-level tracking of such goods may require numbers of sensors ranging into the trillions. Moreover, since any one item may be monitored over its lifetime, or a portion of its lifetime, each item may generate a plurality of read events by the reader 406 over a given period of time.

Although the EPC provides product information for the item 404, as described, each time that the tag 402 is read by the reader 406, an eLC encoding/decoding system 408 incorporating features of the systems 102 and 300, above, is used to provide location-specific information for the item 404, at the time (and at each time) that it is read. For example, the eLC system 408 may output a version of the location code 104 in conjunction with an identification of, and an output of, a reading of the EPC of the item 404.

As described above, the location code may be easily and meaningfully shared and stored, throughout the EPC network architecture 400. That is, each reader 406 may encode the location code 104 to a selected level of accuracy in a manner that is highly compressible and easily de-coded by any other recipient of the location code 104 who has a corresponding eLC system 408 available.

Such recipients of the location code 104 may be located throughout the EPC network, and so corresponding eLC systems also may be located throughout the EPC network. The remainder of FIG. 4, as discussed below, illustrates examples of how the eLC system(s) 408 may be distributed and used in this context.

In FIG. 4, an enterprise application(s) 410 represents one or more of a number of applications that may interface with the EPC network. For example, such enterprise application(s) may include a supply chain management application, which may be used by the enterprise to oversee the process of producing/buying, shipping, and selling of the products or services of the enterprise, or an asset tracking and management system used to monitor and track a number of assets within or across a site, an organization, or across organizations, in order to determine what assets (e.g., inventory assets) are available or unavailable to, or desired by, the enterprise. A warehouse management application may be used to oversee the receiving, stocking, selection, and shipping aspects of a warehouse. An analytic system may be used to quantify aspects of the operations of the enterprise, such as, for example, speed of response to consumer requests, loss resulting from theft, or other factors that may impact a profit or operation of the enterprise.

Such enterprise applications 410 may generally need to gather, share, and use data that is common to one or more enterprise systems. For example, the supply chain management application may need to know how much of a certain type of asset is currently available, based on data within the asset management application. The analytic system may extract data from the other applications, in order, for example, to discover performance issues (such as storage usage, or reasons for delivery delay), problems (such as product counterfeit patterns), and the general visibility of the physical object (item, case, pallet).

Thus, information may be communicated to, shared between, and used by, any of the example enterprise applications just discussed, or others. In this way, the enterprise may obtain and use information that is essentially real-time, across an entire spectrum of its operations. Further, the enterprise may share information with other enterprises. For example, the supply chain management application may be associated with a first enterprise (e.g., a retail store), while the warehouse management application may be associated with a second enterprise (e.g., a manufacturer). By obtaining and sharing information as described herein, the two enterprises may increase an efficiency of both of their respective operations.

As shown, the enterprise application(s) 410 may include, or have access to, the eLC system 408. As a result, the above-described operations may benefit from knowledge of, and sharing of, location information that is specific to, for example, products within and throughout a supply chain of the enterprise(s). As described in greater detail in examples given below, such location knowledge allows the enterprises to manage their supply chains and other operations more efficiently and more securely, and, among other advantages, allows for the effective construction of a location knowledge base that may be queried and examined in order to discover (and correct) any problems that may occur during operations of the enterprise(s).

In this context, and in FIG. 4, an EPC Information Services (EPCIS) layer 412 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the eXtensible Mark-up Language (XML) may be used for the above-described transfer and use of business-level EPC information. The location code 104 may be incorporated into such EPC data, using the above-mentioned languages, or other languages, in a straight-forward manner.

The EPCIS layer 412 receives information from an application manager 414, which is generally operable to oversee information events (e.g., tag reads) and manage the events for communication to the EPCIS layer 412 and thereby to an EPCIS repository 416. The application manager 414 operates to monitor and configure the repository 416 as the repository 416 accumulates data.

The application manager 414 and EPCIS layer 412 have access to an Object Naming Service (ONS) 418, which, similarly to a Domain Name Service (DNS), is a look-up service that allows the application manager 414 and EPCIS layer 412 to find information about a product, based on the EPC code for that product. The ONS 418 may have different levels of information, which may be classified, for example, by whether the information is stored locally or non-locally to the product.

As shown, the eLC system 408 may be implemented at the layer of the application manager 414, EPCIS Repository 416, and ONS 418, so that the application manager 414, EPCIS Repository 416, and ONS 418 either operate the eLC system 408 or have access thereto. In this way, again, each of these applications may track and share location information for a huge number of products in a practical and efficient manner.

That is, as just described, the architecture of FIG. 4 allows for products to be tracked, shared, and accessed, simply by knowing an EPC of the product. Thus, for example, by associating the location code 104 with the EPC of a given product, the repository 416 and ONS 418 may be used to determine a current location of the product, or a history of previous locations of the product, or a projected future path of the product.

Further in FIG. 4, an application level event (ALE) interface layer 420 provides an interface to a device manager 422. That is, since there may be a very large number of readers 406, and a very large number of associated read events for each such reader, the device manager may be used to coordinate the operations of a plurality of readers in an efficient manner. For example, the ALE interface layer 420 may be used in conjunction with the device manager 422 to filter or aggregate read events, as received from a reader protocol interface layer 424, which is designed to enable communication with a number of different types of readers within the network architecture 400. In this context, again, the eLC system 408 may be used to manage location information efficiently by, for example, re-encoding location information to a lower level of accuracy to conserve storage space, or re-encoding location information from a first set of readers 406 so that reference information (e.g., an elevation model or absolute/relative reference information) matches that of a second set of readers 406.

Figure 5:
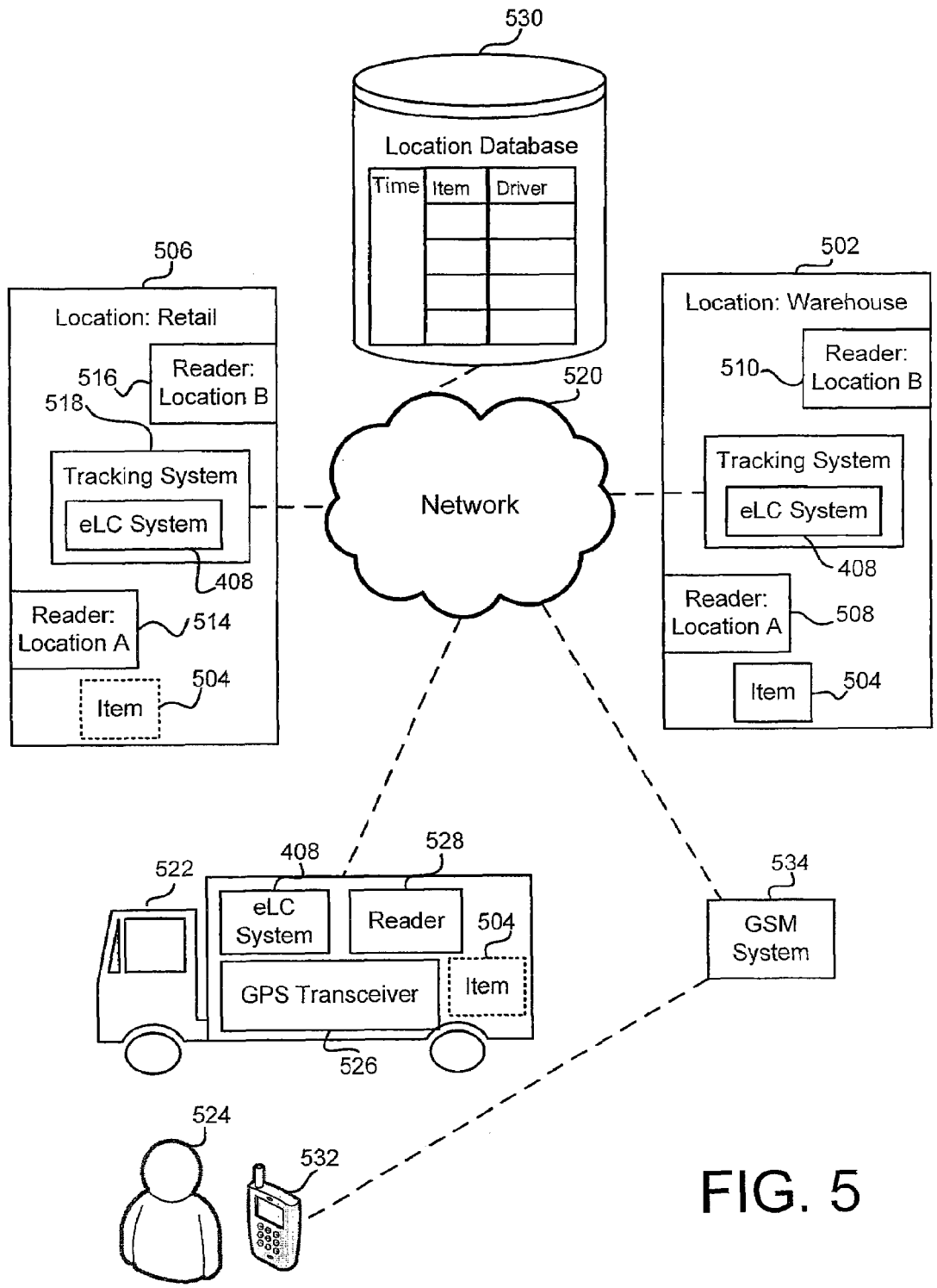
FIG. 5 is a block diagram of an implementation of the item tracking system of FIG. 4.

FIG. 5 is a block diagram of an implementation of the item tracking system of FIG. 4. FIG. 5 provides a few examples of how the eLC system 408 and the location code 104 may be used to provide advantages to users thereof, although many other examples exist.

In FIG. 5, a scenario is illustrated in which a warehouse 502 stores an item 504 that is to be shipped to a retail store 506. Although not illustrated in FIG. 5, it should be understood that the item 504 may include an RFID tag or other identifier by which a reader 508 or a reader 510 may detect and identify the item 504, e.g., by determining an EPC of the item/tag.

As shown, the reader 508 is located at a first location, while the reader 510 is located at a second location. Both readers are in communication with a tracking system 512, which includes an eLC system 408. As described above, although not shown in FIG. 5, an eLC system also may be associated specifically with one or both of the readers 508/510.

Similarly, the retail location 506 includes a reader 514 at a first location, a reader 516 at a second location, and a tracking system 518 that is in communication with the readers 514/516. Both of the tracking systems 512 and 518 are in communication with a network, which may represent, for example, a public network such as the Internet, and/or may include some or all of the EPC network architecture 400 of FIG. 4.

In one scenario, then, a delivery track 522 is assigned to transport the item 504 from the warehouse location 502 to the retail location 506. More particularly, the locations of the readers 508 and 510 may reflect two different loading docks of the warehouse 502, and the truck 522 may be assigned to pick up the item 504 at the loading dock associated with the reader 508.

In this case, the warehouse 502 may have an internal reference for this location, such as "loading dock A." This internal reference, however, may not be useful to a driver 524 of the truck 522, who may not be familiar with the layout of the warehouse 502. Further, although the warehouse 502 may have a Global Location Number (GLN), as referred to above, by which the driver 524 may find a street address of the warehouse, even this information would not be helpful in finding the location of the reader 508 with respect to the warehouse.

By determining an eLC associated with the item 504 (or the reader 508), however, the driver 524 may be directed specifically to the appropriate location. For example, the eLC system 408 may be associated with mapping software, that itself may be associated with a GPS system, perhaps including a transceiver 526, used by the driver 524. That is, by receiving the location code 104 of the item 504, the corresponding latitude/longitude/altitude information may be determined, and correlated with a map or diagram of the warehouse 502. Of course, the GPS system also may provide location information for the truck 522 itself, which may be expressed as a location code as described herein, for correlation relative to the map or diagram of the warehouse 502 and/or to the location code of the item 504.

The driver 524 may thus obtain and load the item 504 for transport to the retail location 506. Similarly to the above, an operator of the retail store 506 may prefer a particular drop-off point for the item 504, which may be communicated by sending the driver 524 the location code 104 of the reader 514 at the preferred location. Again, the driver 524 may meaningfully use this location information, without requiring knowledge of any internal reference or nomenclature for the location that may be used by the retail store operator. Thus, the driver 524 may obtain both the general location of the retail store 506, and the particular drop-off location of the reader 514, by way of a single location code.

The ensuing transportation of the item 504 by way of the truck 522 provides many opportunities for advantageous use of the location code 104. For example, individually tracking the location of the item 508 as it is transported may help prevent, or at least identify, errors that may occur. For example, if a total shipment of the truck 522 is split, due to, for example, a separate delivery along the way, or in order to send other items in the shipment to a different destination, it may be that the item 504 is inadvertently removed from the truck 522. Conversely, it may be that the item 504 should have been removed, but was not.

In such instances, knowledge of a location of the item 504 throughout its movements may be provided by its associated location code(s) 104, over time. For example, a reader 528 may be located on the truck 522, and operable to detect a presence of the item 504. The reader 528 and the GPS transmitter 526 may communicate with the eLC system 408 to generate a stream of updated location codes for the item 504, throughout its movements. Similarly, if the item 504 is (perhaps mistakenly) unloaded from the truck 522 at a given location, then a reader at that location may begin transmitting location codes for the item 504.

As a result, the location codes may effectively form a stream of telemetry data for tracking the item 504, which may be stored in a database 530. Further, the location data may be associated with a time of its gathering, as shown, thereby enabling a number of different types of queries to be performed against the location data.

It should be understood that existing systems may be said to provide some type of location information, since, for example, a manager of the warehouse 502 may know the locations of all the readers within the warehouse. Similarly, someone overseeing a supply chain may have knowledge of all readers along the supply chain, and so may know a location of a transported item, to the extent that the item is read by one of the expected readers.

Such knowledge generally provides an overview of location information, assuming a user is familiar with locations of the expected readers, or if the location of the reader is associated with a GLN of an associated entity. However, if a user is unfamiliar with the locations of expected readers, or if no GLN is available, or if the item is read at an unexpected reader (due to error or malfeasance), then the user may not have any (useful) location data, or may have to perform various additional steps or efforts to act on the available location data.

Further, such location information that is gained indirectly by general knowledge of locations of readers may not be as useful as specific latitude, longitude, and altitude information of the reader(s), or of the item 504 itself. Moreover, such general location knowledge may not easily be extended to a desired level of accuracy, or compared to other location information in a fast and meaningful way, or stored in a compact fashion.

In FIG. 5, however, location codes for the item 504 allow for these and other advantages. For example, as already described, location codes for the item 504 may be transmitted and stored throughout a movement of the item 504. Moreover, the truck 522 also may be tracked, by virtue of the GPS transmitter 526.

Still further, the driver 524 may be tracked, by virtue of, for example, a cell phone 532 of the driver that is tracked by a GSM system 534, as generally described above. Even if there is some compatibility between a particular implementation of the GPS transmitter 526 and the GSM system 534, the location code 104 provides additional advantages, in that the location code 104 is compatible with virtually any such device that is associated with the eLC 408, as well as the various other devices described herein, and other devices. Further, the location code 104 is flexible, extensible, and highly accurate.

The ability of the location code 104 to allow for the tracking of locations of diverse items, objects, and persons in an accurate, consistent manner, across a number of different types of devices, provides a number of possible advantages. To name a few, it may be the case that the driver 524 is under instructions not to travel more than a predefined distance from the truck 522, since the cargo of the truck 522 may be valuable and should not be left alone for fear of theft or damage. By comparing a location code of the cell phone 532 with a location code of the truck 522, despite the presence of potentially disparate systems (i.e., GPS and GSM), the two location codes may be meaningfully compared by anyone with access to the location database 530.

Further, both a time and distance of the driver 524 away from the truck 522 may be ascertained. If a driver were to attempt to steal the item 504 from the truck 522, then location codes from the database 530 may be used to determine a last location at which the item 504 was present on the truck 522.

Many other queries may be made against the database 530. For example, since a location and associated time is known for the item 504, a speed of the item 504 may be calculated. Such information may be useful, when, for example, the item 504 is fragile and should not be accelerated unduly. Further, if a manager of the driver 524 wishes to maintain safe driving practices of the driver 524, then average or instantaneous speeds of the driver 524 may be calculated, as well.

If a number of trucks are delivering items, then comparisons between the two trucks may be made, as well. For example, it may easily be determined how far apart the trucks currently are from one another, or which one is closer to a particular pick-up or delivery site. Such an ability may increase an efficiency of the drivers and managers of the delivery trucks.

Figure 6:
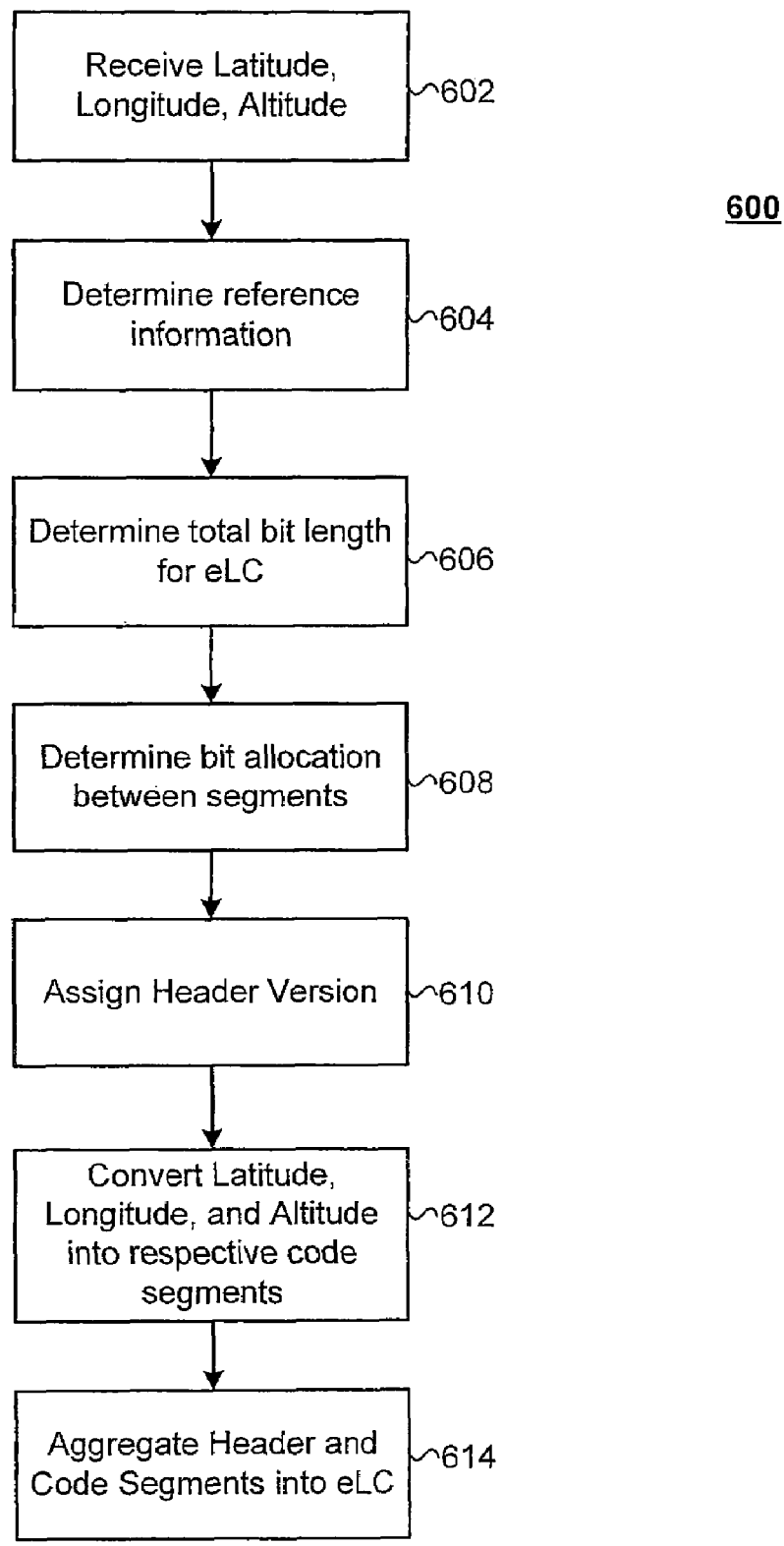
FIG. 6 is a flowchart illustrating an operation of the eLC encoding system of FIG. 1.

FIG. 6 is a flowchart 600 illustrating an operation of the eLC encoding system 102 of FIG. 1. In the example of FIG. 6, the system 102 first receives latitude, longitude, and altitude information from a local or non-local source (602). Then, appropriate reference information, such as, for example, an elevation model and a distinction between an absolute or relative position of the received latitude, longitude, and altitude information, is received (604).

Then, a total bit length of the location code 104 to be formed is determined (606), e.g., either a 96-bit, 64-bit, or other length. A format of the location code 104, e.g., either hexadecimal or binary, may be determined, as well. As described, the total bit length provides greater or lesser degrees of accuracy in the resulting location code.

Then, an allocation of the selected, available number of bits is made (608). In one implementation, as referenced above, the bit length and/or bit allocation selection process may be presented as a selection as a number of levels of accuracy, where each level represents a sub-segment of each of the location code segments 106, 108, and 110. Greater or fewer levels may be assigned to each of the segments in total, or a given number of levels (sub-segments) may be shared in multiple ways between the segments 106, 108, and 110 (i.e., a greater number of levels may be allocated to one segment, at the expense of reducing a number of levels allocated to another segment).

Part of the bit allocation process may include assigning a number of bits to the header segment 112, if this number has not previously been set. Of course, having greater or fewer bits available for the header segment 112 allows fewer or greater bits, respectively, for one or more of the segments 106, 108, and 110.

A header version may then be determined and assigned (610), based on the reference information, bit length, and bit allocation. As described, the designated version of the header segment allows for direct and easy decoding of the location code at the eLC decoding system 300, and may be used as part of the actual conversion of the latitude, longitude, and altitude location components.

That is, once the above information is known, the originally-received latitude, longitude, and altitude information may be converted into the segments 106, 108, and 110 having the appropriate numbers of bits. Then, the segments 106, 108, and 110, along with the header segment 112, may be aggregated into the location code 104 (614).

In some implementations, for example, the reference information and bit length/allocation may be set prior to receipt of the latitude, longitude, and altitude information, so that determinations on these points need not be made each time a location code is formed. For example, a given user of the eLC encoding system 102 may have a specific header version(s) assigned for use, which may be automatically assigned to all incoming location information. As another example, the eLC encoding system 102 may be configured to assign a specific header version, based on a source (e.g., a particular reader) or destination (e.g., a particular storage database) of the location information. In this regard, it should be understood that the user interface 148 may be used to input such settings, as described above with respect to FIG. 1.

Specific techniques for performing the latitude, longitude, and altitude conversions (612) are described in more detail below, with respect to Tables 1-4 and FIGS. 7 and 8.

In particular, Table 1 provides transformation rules for latitude transformations. In Table 1, the following notation is used. $In_{LA}$ refers to an input latitude, expressed in degrees between $-90°$ and $+90°$. $R_{LA}$ refers to a normalizing factor for ensuring correct units, and, in the case of latitude conversion, is $90°$.

$Lx_{LAb}$ refers to a number of bits available for a given level. For example, referring to FIG. 2A, latitude segment 106 has five levels 204. Of these, level 1 includes 6 bits, comprising bits 7-12 of the location code 104a. Therefore, the quantity $Lx_{LAb}$ in this case would be written as $L1_{LAb}=6$ (bits). Similarly, for level 2, the result would be $L2_{LAb}=6$ (bits). In Table 1, the different levels, e.g., the five levels 204 of FIG. 2A, are thus referred to as $Lx_{LA}$, so that level 1 would be expressed as $L1_{LA}$, level 2 would be expressed as $L2_{LA}$, and so on.

Again referring to FIG. 2A, and as already discussed with respect to the location code 104a, a subsegment 202, comprising one bit, may be reserved to indicate a sign of the latitude, so that a $sign_{LA}=0$ when an input latitude $In_{LA}$ is less than zero, and $sign_{LA}=1$ when input latitude $In_{LA}$ is greater than or equal to zero. In other words, for example, if an input latitude $In_{LA}=37°$, then the bit value of subsegment 202 would be 1. If input latitude $In_{LA}=-37°$, then the bit value of subsegment 202 would be 0.

TABLE 1

| Level n (integer) | Remainder Level n [float] |
|---|---|
| $L1_{LA} = \left\lfloor \|In_{LA}\| \cdot \dfrac{2^{L1_{LAb}}}{R_{LA}} \right\rfloor$ | $RL1_{LA} = \|In_{LA}\| - L1_{LA} \cdot \dfrac{R_{LA}}{2^{L1_{LAb}}}$ |
| $L2_{LA} = \left\lfloor RL1_{LA} \cdot \dfrac{2^{(L1_{LAb}+L2_{LAb})}}{R_{LA}} \right\rfloor$ | $RL2_{LA} = RL1_{LA} - L2_{LA} \cdot \dfrac{R_{LA}}{2^{(L1_{LAb}+L2_{LAb})}}$ |
| $L3_{LA} = \left\lfloor RL2_{LA} \cdot \dfrac{2^{(L1_{LAb}+L2_{LAb}+L3_{LAb})}}{R_{LA}} \right\rfloor$ | $RL3_{LA} = RL2_{LA} - L3_{LA} \cdot \dfrac{R_{LA}}{2^{(L1_{LAb}+L2_{LAb}+L3_{LAb})}}$ |
| $L4_{LA} = \left\lfloor RL3_{LA} \cdot \dfrac{2^{(L1_{LAb}+L2_{LAb}+L3_{LAb}+L4_{LAb})}}{R_{LA}} \right\rfloor$ | $RL4_{LA} = RL3_{LA} - L4_{LA} \cdot \dfrac{R_{LA}}{2^{(L1_{LAb}+L2_{LAb}+L3_{LAb}+L4_{LAb})}}$ |
| $L5_{LA} = \left\lfloor RL4_{LA} \cdot \dfrac{2^{(L1_{LAb}+L2_{LAb}+L3_{LAb}+L4_{LAb}+L5_{LAb})}}{R_{LA}} \right\rfloor$ | $RL5_{LA} = RL4_{LA} - L5_{LA} \cdot \dfrac{R_{LA}}{2^{(L1_{LAb}+L2_{LAb}+L3_{LAb}+L4_{LAb}+L5_{LAb})}}$ |

With the above notation, Table 1 includes two columns. The first column represents a transformation rule for inputting a latitude measurement $In_{LA}$, expressed in degrees, and outputting an integer value that corresponds to the latitude measurement to a given level of accuracy. The calculation depends on the input latitude $In_{LA}$, and on a number of bits available at the given level, $Lx_{LAb}$.

The second column represents a rule for capturing a remainder of the information beyond what may be expressed at a given level, given the number of bits available at that level (and at preceding levels), and given a level of accuracy of the input latitude measurement $In_{LA}$ itself. This remainder value is notated as $RLx_{LA}$, or, for the example of level 1, $RL1_{LA}$.

For example, for an input latitude $In_{LA}$ that is only known to be $37.425°$, and assuming a number of bits at level 1 is $L1_{LAb}=6$, as in FIG. 2A, then, in Table 1, column 1, the first calculation would result in a value of $L1_{LA}=(37.425)(2^6=64)/90$, or approximately 26.755, resulting in an integer value of n=26. The value 26 may then be converted to a desired data format, e.g., a binary data format, and represented as 011010, using all 6 available bits at level 1, in this example.

If this level of accuracy is acceptable (the degree of resolution represented by this number is discussed in more detail below), then the remaining bits of the location code may be used for longitude and altitude measurements, or simply expressed as zeros. However, to gain greater resolution and accuracy in expressing the latitude measurement of $37.425°$, and as described above, a next level or sub-segment, of the location code may be calculated based on a remainder value that represents additional resolution that is not expressible with just the number of bits available at the previous level(s).

For instance, continuing the given example, a remainder value $RL1_{LA}$ would be, according to the first entry of the second column of Table 1, $RL1_{LA}$=(37.425)−[(26)(90)/(64)], or 0.8625. This value may then serve as the basis for calculating the integer value $L2_{LA}$ in the second entry of the first column of Table 1, which, in this case, would be 39, or, as expressed in binary form, 100111. As may be seen, a subsequent remainder value $RL2_{LA}$ may then be calculated, if desired. Then, the binary-formatted results may be aggregated by concatenation, which, in this case, results in 1011010100111 (including the first bit of 1 to express the fact that the input latitude 37.425° was positive in sign). A fully-worked example is provided below, with respect to FIG. 8, that uses the above numbers and assumptions, and illustrates results for five levels of the latitude segment 106, as well as corresponding results for the longitude segment 108 and the altitude segment 110 of the location code 104.

Figure 7:
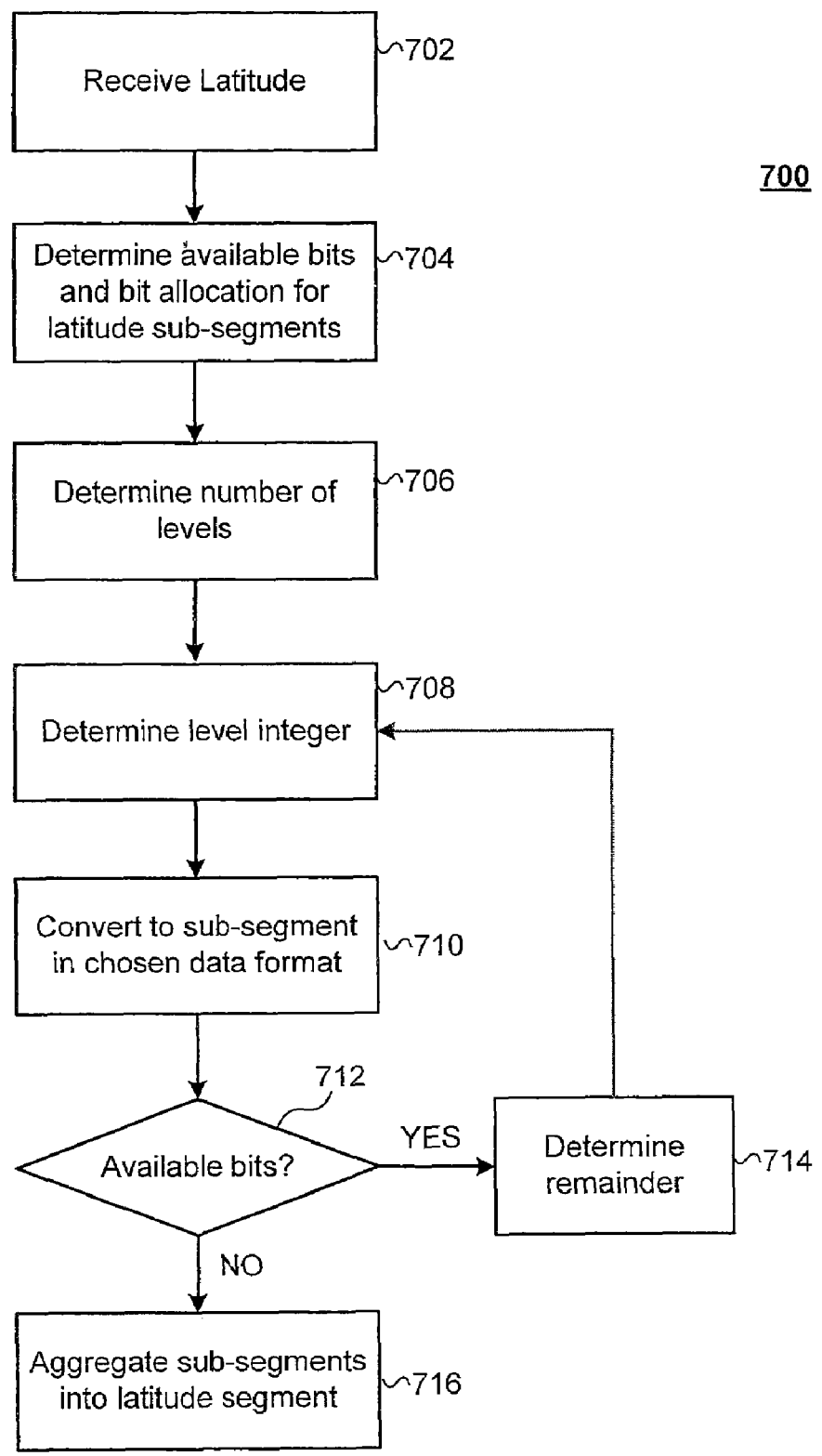
FIG. 7 is a flowchart illustrating a process used in the operation of FIG. 6.

FIG. 7 is a flowchart 700 illustrating a general application of the process just described with respect to Table 1, and used in the operation of FIG. 6. Specifically, FIG. 7 illustrates the described implementation of the conversion of location information (specifically, a latitude component) into the corresponding (i.e., latitude) segment 106 of the location code 104.

In FIG. 7, and as just discussed, the latitude component $In_{LA}$ is received and accessed (702), i.e., apart from the longitude and/or altitude information, at, for example, the latitude converter 122. The latitude converter 122 may then determine a number of available bits for the latitude segment 106, as well as the allocation of the bits to each available sub-segment or level (704), expressed above as a number of bits $Lx_{LAb}$ for each level. Thus, the latitude converter 122 may determine a number of available levels of accuracy (i.e., sub-segments) (706). Conversely, of course, the latitude converter 122 could determine the number of bits $LX_{LAb}$ for each level by first obtaining the total bit length for the latitude segment 106 and the number of levels of the segment 106.

Then, proceeding through the transformation rules outlined above, a level integer is calculated (708) for the first level. In the above example, the level 1 integer worked out to be 26. This level integer may then be converted to a resulting sub-segment in the chosen (e.g., binary) data format, and temporarily stored (710).

If further levels (bits) are available (712), then the latitude converter 122 may calculate a remainder value $RLx_{LA}$, which, in the present instance, would be a first remainder value for the first level, or $RL1_{LA}$. Then, this value $RL1_{LA}$ may be used to calculate the next level integer (708).

The process continues until no more levels are available, at which points the calculated sub-segments are aggregated (with the sign bit) into the latitude segment 106 (716). In other implementations, the sub-segments may be concatenated on an ongoing basis, as each sub-segment is calculated.

The process of FIG. 7 may be replicated by similar processes for the longitude converter 124 and the altitude converter 126, by following appropriate transformation rules used by those converters. Examples of such transformation rules are provided below with respect to Table 2 and Table 3.

Specifically, Table 2 provides transformation rules for the longitude converter 124. In Table 2, and analogously to Table 1, the following notation is used. $In_{LO}$ refers to an input longitude, expressed in degrees between −180° and +180°. $R_{LO}$ refers to a normalizing factor for ensuring correct units, and, in the case of longitude conversion, is 180°.

The expression of latitude and longitude as −90°<$In_{LA}$<90° and −180°<$In_{LO}$<180°, respectively, may be noted to result from the definitions of those terms. Specifically, latitude and longitude define a grid system of the Earth. By slicing at the equator, a longitude line (meridian) is defined at each degree around the circle (e.g., equator), with all such longitude lines meeting at the poles. Slicing through a longitude line at each degree also results in corresponding circles, providing latitude lines.

By defining the equator as zero degrees and measuring north at each degree (latitude line) as a positive value, a latitude line of 90° is reached at the north pole, and, similarly, a latitude line of −90° is reached at the south pole. For longitude, international agreement defines zero degrees longitude as a particular longitude line known as the prime meridian, and longitudinal distances are measured east and west until they meet 180° later.

Further in Table 2, $LX_{LOb}$ refers to a number of bits available for a given longitude level, or, for example, $L1_{LOb}$=7 (bits) in FIG. 2A, while $L2^{LOb}$=6 (bits). In Table 2, the levels are referred to as $Lx_{LO}$, so that level 1 would be expressed as $L1_{LO}$, level 2 would be expressed as $L2_{LO}$, and so on.

As in Table 1 for latitude, a sub-segment comprising one bit may be reserved to indicate a sign of the longitude, so that a $sign_{LO}$=0 when an input longitude $In_{LO}$ is less than zero, and $sign_{LO}$=1 when input longitude $In_{LO}$ is greater than or equal to zero.

TABLE 2

| Level n (integer) | Remainder Level n (float) |
| --- | --- |
| $L1_{LO} = \left\lfloor \|In_{LO}\| \cdot \dfrac{2^{L1_{LOb}}}{R_{LO}} \right\rfloor$ | $RL1_{LO} = \|In_{LO}\| - L1_{LO} \cdot \dfrac{R_{LO}}{2^{L1_{LOb}}}$ |
| $L2_{LO} = \left\lfloor RL1_{LO} \cdot \dfrac{2^{(L1_{LOb}+L2_{LOb})}}{R_{LO}} \right\rfloor$ | $RL2_{LO} = RL1_{LO} - L2_{LO} \cdot \dfrac{R_{LO}}{2^{(L1_{LOb}+L2_{LOb})}}$ |
| $L3_{LO} = \left\lfloor RL2_{LO} \cdot \dfrac{2^{(L1_{LOb}+L2_{LOb}+L3_{LOb})}}{R_{LO}} \right\rfloor$ | $RL3_{LO} = RL2_{LO} - L3_{LO} \cdot \dfrac{R_{LO}}{2^{(L1_{LOb}+L2_{LOb}+L3_{LOb})}}$ |

TABLE 2-continued

| Level n (integer) | Remainder Level n (float) |
|---|---|
| $L4_{LO} = \left\lfloor RL3_{LO} \cdot \dfrac{2^{(L1_{LOb}+L2_{LOb}+L3_{LOb}+L4_{LOb})}}{R_{LO}} \right\rfloor$ | $RL4_{LO} = RL3_{LO} - L4_{LO} \cdot \dfrac{R_{LO}}{2^{(L1_{LOb}+L2_{LOb}+L3_{LOb}+L4_{LOb})}}$ |
| $L5_{LO} = \left\lfloor RL4_{LO} \cdot \dfrac{2^{(L1_{LOb}+L2_{LOb}+L3_{LOb}+L4_{LOb}+L5_{LOb})}}{R_{LO}} \right\rfloor$ | $RL5_{LO} = RL4_{LO} - L5_{LO} \cdot \dfrac{R_{LO}}{2^{(L1_{LOb}+L2_{LOb}+L3_{LOb}+L4_{LOb}+L5_{LOb})}}$ |

With the above notation, Table 2 includes a first column representing a transformation rule for inputting a longitude measurement $In_{LO}$, expressed in degrees, and outputting an integer value that corresponds to the longitude measurement to a given level of accuracy. The second column represents the remainder value $RLx_{LO}$, or, for the example of level 1, $RL1_{LO}$.

Table 3 provides transformation rules for the altitude converter 126. In Table 3, and analogously to Tables 1 and 2, the following notation is used. $IN_{AL}$ refers to an input altitude, expressed in meters over sea level. $R_{AL}$ refers to a normalizing factor for ensuring correct units, and, in the case of altitude conversion, is set with respect to an altitude offset $Off_{AL}$ and a maximum altitude $Max_{AL}$. That is, for altitude, it may be assumed for a given elevation model that only a certain (small) distance below sea level will be of interest, and, similarly, that some defined maximum altitude may be set, above which no altitude measurements are expected. In effect, an altitude range may be set, and, in the examples below, the altitude range is assumed to be between $Off_{AL}=-24$ km and $Max_{AL}=1000$ km, or 1,024,000 m.

Further in Table 3, $Lx_{ALb}$ refers to a number of bits available for a given altitude level, or, for example, $L1_{ALb}=6$ (bits) in FIG. 2A. In Table 3, the levels are referred to as $Lx_{AL}$, so that level 1 would be expressed as $L1_{AL}$, level 2 would be expressed as $L2_{AL}$, and so on.

A sub-segment of one bit may be reserved to indicate a sign of the altitude. Alternatively, and in the examples below, the range mentioned above may be adjusted so that the offset value $Off_{AL}$ is considered zero, and altitude may be expressed as a negative value for any values under 24 km.

With the above notation, Table 3 includes a first column representing a transformation rule for inputting a longitude measurement $In_{AL}$, expressed in meters, and outputting an integer value that corresponds to the altitude measurement to a given level of accuracy. The second column represents the remainder value $RLx_{AL}$, or, for the example of level 1, $RL1_{AL}$.

FIGS. 8A-8C are tables illustrating a result of the operations of FIGS. 6 and 7. Specifically, FIGS. 8A-8C illustrate an example in which, respectively, input latitude $In_{LA}=37.425°$, as above, while input longitude $In_{LO}=-122.21°$, and input altitude $In_{AL}=-12345.786$ (using the above-defined range for defining altitude).

The desired eLC for FIGS. 8A-8C corresponds to a 96-bit example in binary format. Bits available for latitude are expressed as $L1_{LAb}=L2_{LAb}=L3_{LAb}=L4_{LAb}=L5_{LAb}=6$, or 31 total, included the first bit for designating sign. Bits available for longitude are expressed as $L1_{LOb}=7$; and $L2_{LOb}=L3_{LOb}=L4_{LOb}=L5_{LOb}=6$, totaling 32 with the bit for designating sign. Bits available for altitude are expressed as $L1_{ALb}=6$; and $L2_{ALb}=L3_{ALb}=L4_{ALb}=5$, totaling 21. For the 96 bit total bit length, this implies that 12 bits remain for a header segment. Alternatively, altitude could be expressed to an additional level of accuracy by adding, for example, $Lx_{Alb}=6$, leaving six bits for the header segment. Or, if that level of accuracy is not available, a final level could be filled with placeholder values of zero, if necessary to conform to requirements for total bit length and/or header bit length.

In FIG. 8A, application of the transformation rules for Table 1, above, provides level 1 results 802 in which L1=26 and RL1=0.8625. Conversion of the integer value L1=26

TABLE 3

| Level n (integer) | Remainder Level n (float) |
|---|---|
| $L1_{AL} = \left\lfloor (In_{AL} + Off_{AL}) \cdot \dfrac{2^{L1_{ALb}}}{R_{AL}} \right\rfloor$ | $RL1_{AL} = In_{AL} + Off_{AL} - L1_{AL} \cdot \dfrac{R_{AL}}{2^{L1_{ALb}}}$ |
| $L2_{AL} = \left\lfloor RL1_{AL} \cdot \dfrac{2^{(L1_{ALb}+L2_{ALb})}}{R_{AL}} \right\rfloor$ | $RL2_{AL} = RL1_{AL} - L2_{AL} \cdot \dfrac{R_{AL}}{2^{(L1_{ALb}+L2_{ALb})}}$ |
| $L3_{AL} = \left\lfloor RL2_{AL} \cdot \dfrac{2^{(L1_{ALb}+L2_{ALb}+L3_{ALb})}}{R_{AL}} \right\rfloor$ | $RL3_{AL} = RL2_{AL} - L3_{AL} \cdot \dfrac{R_{AL}}{2^{(L1_{ALb}+L2_{ALb}+L3_{ALb})}}$ |
| $L4_{AL} = \left\lfloor RL3_{AL} \cdot \dfrac{2^{(L1_{ALb}+L2_{ALb}+L3_{ALb}+L4_{ALb})}}{R_{AL}} \right\rfloor$ | $RL4_{AL} = RL3_{AL} - L4_{AL} \cdot \dfrac{R_{AL}}{2^{(L1_{ALb}+L2_{ALb}+L3_{ALb}+L4_{ALb})}}$ |
| $L5_{AL} = \left\lfloor RL4_{AL} \cdot \dfrac{2^{(L1_{ALb}+L2_{ALb}+L3_{ALb}+L4_{ALb}+L5_{ALb})}}{R_{AL}} \right\rfloor$ | $RL5_{AL} = RL4_{AL} - L5_{AL} \cdot \dfrac{R_{AL}}{2^{(L1_{ALb}+L2_{ALb}+L3_{ALb}+L4_{ALb}+L5_{ALb})}}$ | results in a sub-segment 804 written in binary form as 011010. The remainder RL1 may then be used to determine level 2 results 806, including a sub-segment 808 written as 100111. Similar comments apply for remaining levels.

Further, similar comments apply to FIGS. 8B and 8C. The result is that the sub-segments 804, 808, and all remaining sub-segments of FIGS. 8A-8C may be concatenated in a top-down fashion, and including the $sign_{LA}$ and $sign_{LO}$ bits associated with the signs of the input latitude and longitude, respectively. By including a fictitious 6 bit header segment of 000100 for example, and assuming a placeholder value of six zeros in the altitude portion, the resulting location code is eLC=000100101101010011010000001101101001010101 1101110011110100110110011001011101001110111101 01000000.

The results of the above example are summarized below in Table 4. In Table 4, as in FIGS. 8A-8C, above, the eLC is expressed in binary format. However, as referenced above, by first expressing the header and each of the segments in hexadecimal format and then concatenating in the above-described order with a "." as a delimiter, a hexadecimal expression for the chosen 3-dimensional location also may be obtained.

TABLE 4

|  | Level n [integer] | Level n in binary format |
| --- | --- | --- |
| Latitude | $Sign_{LA} = 1$ | 1 |
| $In_{LA} = 37.425[D]$ | $L1_{LA} = 26$ | 011010 |
|  | $L2_{LA} = 39$ | 100111 |
|  | $L3_{LA} = 16$ | 010000 |
|  | $L4_{LA} = 13$ | 001101 |
|  | $L5_{LA} = 41$ | 101001 |
|  | Latitude eLC-Segment: | 1011010100111010000001101101001 |
| Longitude | $Sign_{LO} = 0$ | 0 |
| $In_{LO} = -122.21[D]$ | $L1_{LO} = 86$ | 1010110 |
|  | $L2_{LO} = 57$ | 111001 |
|  | $L3_{LO} = 58$ | 111010 |
|  | $L4_{LO} = 27$ | 011011 |
|  | $L5_{LO} = 12$ | 001100 |
|  | Longitude eLC-Segment: | 0101011011100111101001101100 |
| Altitude | $L1_{AL} = 46$ | 000001 |
| $In_{AL} = -12345.786[m]$ | $L2_{AL} = 19$ | 10011 |
|  | $L3_{AL} = 23$ | 10111 |
|  | $L4_{AL} = 21$ | 10101 |
|  | $L5_{AL} = 0$ | 000000 |
|  |  | 101110100111011110101000000 |

Figure 9:
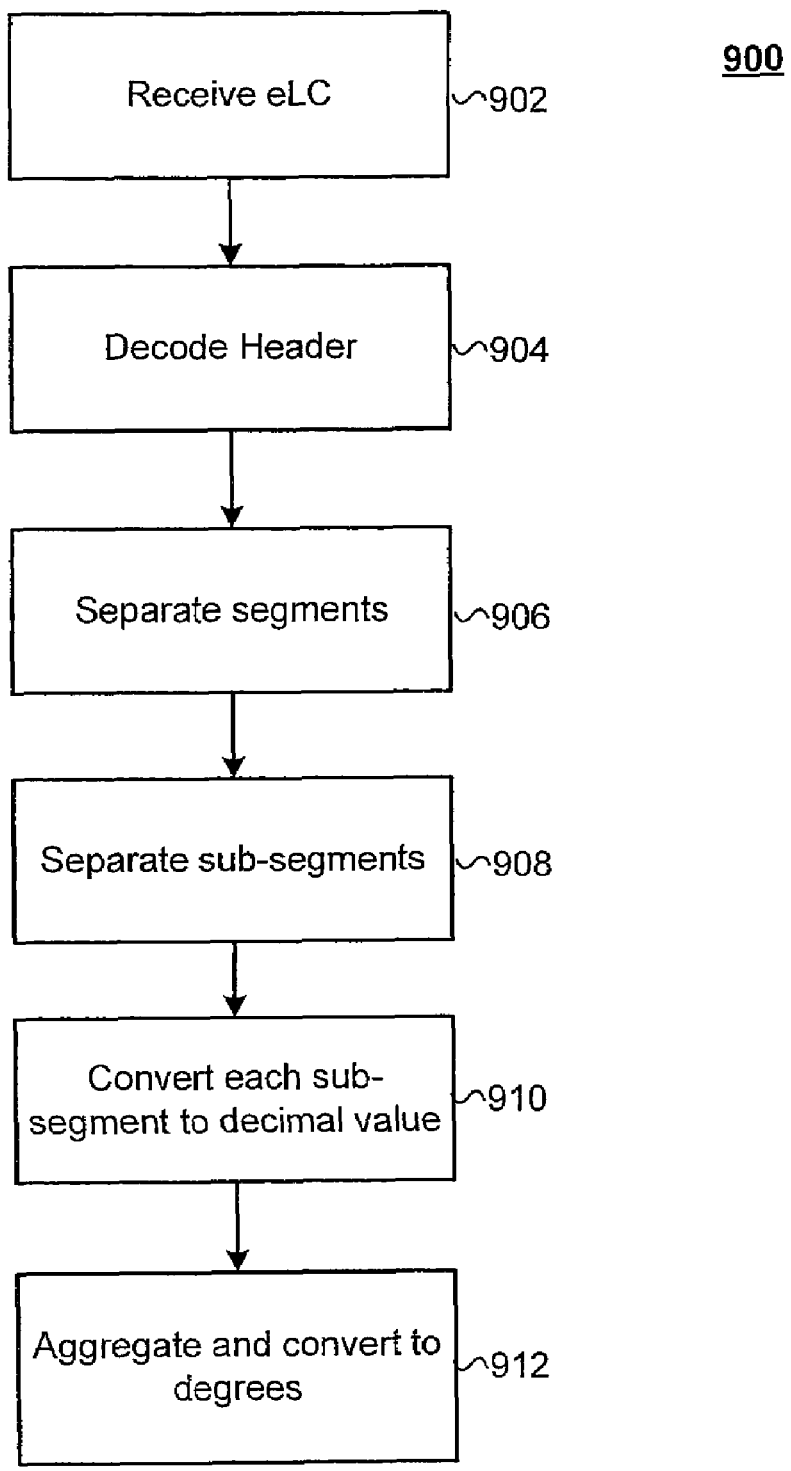
FIG. 9 is a flowchart illustrating an operation of the eLC decoding system of FIG. 3.

FIG. 9 is a flowchart illustrating an operation of the eLC decoding system 300 of FIG. 2. In FIG. 9, the location code 104 is received (902), and header segment is decoded (904) at the header decoder 302. By virtue of the decoding of the header segment, a bit length of the location segments 106, 108, and 110 may be determined from among a total bit length of the location code 104, so that the segments may be separated (906) at the segment separator 304.

Also by virtue of the header segment, the precision levels of each segment may be determined; that is, a length of each sub-segment of each segment may be determined (908). Then, each sub-segment is written in integer form and converted into an exact decimal value (910), using, for example, the transformation rules illustrated in Table 5, below, as implemented in the component conversion system 306.

TABLE 5

Transformation Rules from eLC into Latitude, Longitude [Decimal Degree], Alt [m] over sea level:

$$Lat = Sign_{LA} \cdot R_{LA} \cdot \left( \frac{L1_{LA}}{2^{L1_{LAb}}} + \frac{L2_{LA}}{2^{(L1_{LAb}+L2_{LAb})}} + \frac{L3_{LA}}{2^{(L1_{LAb}+L2_{LAb}+L3_{LAb})}} + \frac{L4_{LA}}{2^{(L1_{LAb}+L2_{LAb}+L3_{LAb}+L4_{LAb})}} + \frac{L5_{LA}}{2^{(L1_{LAb}+L2_{LAb}+L3_{LAb}+L4_{LAb}+L5_{LAb})}} \right)$$

$$Lat = Sign_{LO} \cdot R_{LO} \cdot \left( \frac{L1_{LO}}{2^{L1_{LOb}}} + \frac{L2_{LO}}{2^{(L1_{LOb}+L2_{LOb})}} + \frac{L3_{LO}}{2^{(L1_{LOb}+L2_{LOb}+L3_{LOb})}} + \frac{L4_{LO}}{2^{(L1_{LOb}+L2_{LOb}+L4_{LOb}+L5_{LOb})}} + \frac{L5_{LO}}{2^{(L1_{LOb}+L2_{LOb}+L3_{LOb}+L4_{LOb}+L5_{LOb})}} \right)$$

TABLE 5-continued

Transformation Rules from eLC into Latitude, Longitude [Decimal Degree], Alt [m] over sea level:

$$Alt = -Off_{AL} + (Off_{AL} + Max_{AL}) \cdot \left( \frac{L1_{AL}}{2^{L1_{ALb}}} + \frac{L2_{AL}}{2^{(L1_{ALb}+L2_{ALb})}} + \frac{L3_{AL}}{2^{(L1_{ALb}+L2_{ALb}+L3_{ALb})}} + \frac{L4_{AL}}{2^{(L1_{ALb}+L2_{ALb}+L3_{ALb}+L4_{ALb})}} + \frac{L5_{AL}}{2^{(L1_{ALb}+L2_{ALb}+L3_{ALb}+L4_{ALb}+L5_{ALb})}} \right)$$

Then, in the case of latitude and longitude, the sub-segments are aggregated and converted into degrees (912). In the case of altitude, the sub-segments are aggregated and converted to meters, according to the defined reference/elevation model (912), as also shown by the transformation rules of Table 5, above.

By applying the transformation rules of Table 5 to the encoding example provided above, for example, the original latitude, longitude, and altitude measurements may be (re)obtained, to whatever level of accuracy, approximately, that was used in the original encoding process. In this case, the resulting location information includes a latitude of 37.424999°, a longitude of −122.21°, and an altitude of −12345.78705 m.

As described above, providing a variety of available levels for use in encoding a particular location code allows a selection in a level of precision for the code as a whole, and for each segment of the code. Moreover, the available bit lengths, such as the 96-bit length discussed above, allows for extremely accurate resolution of location measurements, in a compact form that is easily transmitted, stored, and de-coded.

As an example of the level of precision that is enabled by the location code described herein, Table 6 illustrates an example of a latitude segment having SegBit=31 bits (which, assuming a 6-bit header segment, comprise bits Bit=7-37 of the location code as a whole.

TABLE 6

|     | SegBit | Bit | Level   | Resolution [m]  |
|-----|--------|-----|---------|-----------------|
| LAT | 1      | 7   | Sign    | 10,018,752.6006 |
|     | 2      | 8   | Level 1 | 5,009,376.3003  |
|     | 3      | 9   |         | 2,504,688.1501  |
|     | 4      | 10  |         | 1,252,344.0751  |
|     | 5      | 11  |         | 626,172.0375    |
|     | 6      | 12  |         | 313,086.0188    |
|     | 7      | 13  |         | 156,543.0094    |
|     | 8      | 14  | Level 2 | 78,271.5047     |
|     | 9      | 15  |         | 39,135.7523     |
|     | 10     | 16  |         | 19,567.8762     |
|     | 11     | 17  |         | 9,783.9381      |
|     | 12     | 18  |         | 4,891.9690      |
|     | 13     | 19  |         | 2,445.9845      |
|     | 14     | 20  | Level 3 | 1,222.9923      |
|     | 15     | 21  |         | 611.4961        |
|     | 16     | 22  |         | 305.7481        |
|     | 17     | 23  |         | 152.8740        |
|     | 18     | 24  |         | 76.4370         |
|     | 19     | 25  |         | 38.2185         |
|     | 20     | 26  | Level 4 | 19.1093         |
|     | 21     | 27  |         | 9.5546          |
|     | 22     | 28  |         | 4.7773          |
|     | 23     | 29  |         | 2.3887          |
|     | 24     | 30  |         | 1.1943          |
|     | 25     | 31  |         | 0.5972          |
|     | 26     | 32  | Level 5 | 0.2986          |
|     | 27     | 33  |         | 0.1493          |
|     | 28     | 34  |         | 0.0746          |
|     | 29     | 35  |         | 0.0373          |
|     | 30     | 36  |         | 0.0187          |
|     | 31     | 37  |         | 0.0093          |

Table 6 illustrates inclusion of the sign bit, along with five levels, each level having six bits. As shown, after level 4, a resolution of less than a meter is reached, while use of the fifth level provides a resolution of well less than a centimeter.

As described, such resolution is available in a format that is universally accessible, requiring only, for example, knowledge of available header versions and the above-provided transformation rules for encoding general location information such as latitude, longitude, and altitude, and for decoding location codes.

Although the above examples have described latitude, longitude, and altitude as the location information to be received and encoded, it should be understood that many other types of location information and/or coordinate systems may be used. For example, Universal Transverse Mercator (UTM) coordinate systems may be used.

Also, although the above discussion includes explicit reference only to Earth, it should be understood that specification of location on other planets or planetary bodies also may benefit from use of the location code described herein. For example, exploratory missions to the moon or Mars may be able to transmit location data using the principles described.

Still further, although many of the examples above are given in the context of the distribution and sale of goods, it should be understood that the location code described herein may be used in virtually any circumstance in which location information is required. For example, it may be the case that livestock are provided with RFID tags, so that their location may be tracked. In particular, such information may be useful during an outbreak of disease, since a path of a specific diseased animal may be tracked specifically, and contamination may be contained.

As another example, certain manufacturing processes make use of location information in coordinating the actions of employees, equipment, and, in some cases, robots. In particular, processes that use robots to move throughout a factory floor to perform various assembly procedures may benefit from being able to track the movements of the robots to a high level of specificity. For example, robots may work at relatively high speeds and relatively close quarters to one another, or to human workers, and may need to be able to be guided to a high level of precision.

A number of implementations have been described. Nevertheless, it will be understood that various modifications may be made. Accordingly, other implementations are within the scope of the following claims.

What is claimed is:

1. A method comprising:
   receiving location information for an object, the location information including a location component that characterizes a first aspect of a location of the object;
   transforming the location component to a location code segment formatted using a designated data format;
   automatically selecting a header segment indicative of the designated data format, based on reference information and precision information;
   aggregating the location code segment with the header segment; and
   outputting the aggregated location code segment and the header segment, as an electronic location code.

2. The method of claim 1, wherein the aspect of the location of the object is a latitude, longitude, or altitude of the object.

3. The method of claim 1, wherein the location information is received from a Global Positioning System (GPS) system, a Global Location Number (GLN) system, a Global System for Mobile Communications (GSM) system, or an auto-identification (auto-id) system.

4. The method of claim 1, wherein the location information is received from a system that tracks location based upon known reference points.

5. The method of claim 1, wherein the designated data format further comprises a hexadecimal or binary data format.

6. The method of claim 1, wherein the header segment is further indicative of an elevation model that operates as a reference for altitude information in the location code segment.

7. The method of claim 6, wherein the elevation model is a sea level elevation model over an (X,Y) coordinate surface of the Earth.

8. The method of claim 1, wherein the header segment is further indicative of an absolute/relative position indicator that indicates whether the location code segment stores absolute or relative position information.

9. The method of claim 1, further comprising dynamically controlling a length of the aggregated location code, the header segment, or the location code segment.

10. The method of claim 1, wherein the length of the aggregated location code, the header segment, or the location code segment is dynamically controlled based on a precision of the received location information, on a desired precision of the location code segment, on a source of the location information, on a destination of the output electronic location code, or on a user preference.

11. The method of claim 1, wherein selecting the header segment further comprises:
   comparing the reference information and the precision information to a list of available header segments; and
   selecting the header segment appropriate to the reference information and the precision information from the list of available header segments.

12. The method of claim 1, wherein the reference information further comprises an elevation model and a indication of an absolute or relative position of the received location information.

13. The method of claim 1, further comprising determining reference information and precision information based on the received location information.

14. The method of claim 1, wherein the electronic location code describes a three-dimensional location of the object in a digital form.

15. The method of claim 1, wherein the location information is received from a Radio Frequency IDentification (RFID) reader device.

16. A computer program product, tangibly embodied in a machine-readable medium, the computer program product comprising instructions that, when read by a machine, cause a data processing apparatus to:
   receive location information for an object, the location information including a location component that characterizes a first aspect of a location of the object;
   transform the location component to a location code segment formatted using a designated data format;
   automatically select a header segment indicative of the designated data format, based on reference information and precision information;
   aggregate the location code segment with the header segment; and
   output the aggregated location code segment and the header segment, as an electronic location code.

17. A device comprising:
   means for receiving location information for an object, the location information including a location component that characterizes a first aspect of a location of the object;
   means for transforming the location component to a location code segment formatted using a designated data format;
   means for automatically selecting a header segment indicative of the designated data format, based on reference information and precision information;
   means for aggregating the location code segment with the header segment; and
   means for outputting the aggregated location code segment and the header segment, as an electronic location code.

18. A device comprising:
   an input module configured to receive location information for an object, the location information including a location component that characterizes a first aspect of a location of the object;
   a component conversion module configured to transform the location component to a location code segment formatted using a designated data format;
   a header assignment module configured to automatically select a header segment indicative of the desired data format, based on reference information and precision information; and
   an aggregator configured to:
      aggregate the location code segment with the header segment, and
      output the aggregated location code segment and the header segment, as an electronic location code.

19. A method comprising:
   receiving location information for an object, the location information including a location component that characterizes a first aspect of a location of the object;
   transforming the location component to a location code segment formatted using a designated data format;
   aggregating the location code segment with a header segment indicative of the designated data format; and
   outputting the aggregated location code segment and the header segment, as an electronic location code,
   wherein the header segment is a sea level elevation model over an (X, Y) coordinate surface of the Earth and is further indicative of an elevation model that operates as a reference for altitude information in the location code segment.

20. A computer program product, tangibly embodied in a machine-readable medium, the computer program product comprising instructions that, when read by a machine, cause a data processing apparatus to:
   receive location information for an object, the location information including a location component that characterizes a first aspect of a location of the object;
   transform the location component to a location code segment formatted using a designated data format;
   aggregate the location code segment with a header segment indicative of the designated data format; and
   output the aggregated location code segment and the header segment, as an electronic location code,
   wherein the header segment is a sea level elevation model over an (X, Y) coordinate surface of the Earth and is further indicative of an elevation model that operates as a reference for altitude information in the location code segment.

21. A device comprising:
   means for receiving location information for an object, the location information including a location component that characterizes a first aspect of a location of the object;
   means for transforming the location component to a location code segment formatted using a designated data format;
   means for aggregating the location code segment with a header segment indicative of the designated data format; and
   means for outputting the aggregated location code segment and the header segment, as an electronic location code,
   wherein the header segment is a sea level elevation model over an (X, Y) coordinate surface of the Earth and is further indicative of an elevation model that operates as a reference for altitude information in the location code segment.

22. A device comprising:
an input module configured to receive location information for an object, the location information including a location component that characterizes a first aspect of a location of the object;
a component conversion module configured to transform the location component to a location code segment formatted using a designated data format; and
an aggregator configured to:
  aggregate the location code segment with a header segment indicative of the designated data format, and
  output the aggregated location code segment and the header segment, as an electronic location code,
wherein the header segment is a sea level elevation model over an (X, Y) coordinate surface of the Earth and is further indicative of an elevation model that operates as a reference for altitude information in the location code segment.

* * * * *

UNITED STATES PATENT AND TRADEMARK OFFICE
CERTIFICATE OF CORRECTION

PATENT NO. : 7,457,720 B2 Page 1 of 1
APPLICATION NO. : 11/842708
DATED : November 25, 2008
INVENTOR(S) : Peter S. Ebert It is certified that error appears in the above-identified patent and that said Letters Patent is hereby corrected as shown below:

On the Title Page, Item (73) Assignee, Change "Waldorf" to --Walldorf--

Signed and Sealed this

Seventh Day of April, 2009

JOHN DOLL
*Acting Director of the United States Patent and Trademark Office*